United States Patent
Wallis et al.

(10) Patent No.: US 12,360,684 B2
(45) Date of Patent: Jul. 15, 2025

(54) SYSTEM-ON-CHIP INCORPORATING A DIRECT MEMORY ACCESS CIRCUIT AND CORRESPONDING METHOD

(71) Applicant: STMicroelectronics (Rousset) SAS, Rousset (FR)

(72) Inventors: Mark Wallis, Mouans Sartoux (FR); Laurent Lestringand, Antibes (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 154 days.

(21) Appl. No.: 18/192,237

(22) Filed: Mar. 29, 2023

(65) Prior Publication Data
US 2023/0359368 A1    Nov. 9, 2023

(30) Foreign Application Priority Data
May 5, 2022    (FR) .................................... 2204276

(51) Int. Cl.
*G06F 3/06*    (2006.01)

(52) U.S. Cl.
CPC .......... *G06F 3/0622* (2013.01); *G06F 3/0637* (2013.01); *G06F 3/0673* (2013.01)

(58) Field of Classification Search
CPC ..... G06F 3/0634; G06F 3/0617; G06F 3/0683
See application file for complete search history.

(56) References Cited

U.S. PATENT DOCUMENTS

| 2019/0317904 A1 | 10/2019 | Letey et al. |
| 2021/0049286 A1 | 2/2021 | Zhang et al. |
| 2021/0264065 A1* | 8/2021 | Barzic ..................... G06F 21/85 |

* cited by examiner

*Primary Examiner* — Eric Cardwell
(74) *Attorney, Agent, or Firm* — Slater Matsil, LLP (57) ABSTRACT

In accordance with an embodiment, a system-on-chip includes: a memory circuit comprising a first memory region accessible with a first access right level and a second memory region accessible with the first access right level or a second access right level, at least one first peripheral having the first access right level, at least one second peripheral having the second access right level; and a direct memory access circuit configured to generate direct memory accesses, wherein the direct memory access circuit includes at least one first direct memory access controller having the first access right level and at least one second direct memory access controller having the second access right level.

20 Claims, 2 Drawing Sheets

SYSTEM-ON-CHIP INCORPORATING A DIRECT MEMORY ACCESS CIRCUIT AND CORRESPONDING METHOD

CROSS-REFERENCE TO RELATED APPLICATIONS

This application claims the benefit of French Patent Application No. 2204276, filed on May 5, 2022, which application is hereby incorporated herein by reference.

TECHNICAL FIELD

Embodiments and implementations relate to system-on-chips, in particular a direct memory access circuit and a corresponding method.

BACKGROUND

Microcontrollers and processors within a system-on-chip generally have functions that can be used by some applications when these are executed by the processor. Some of these functions need to be protected against unauthorized actions, like for example an unauthorized intrusion in the memory of the system allowing having access to sensitive data, or a blockage of the critical functions of the system.

To avoid these unauthorized actions, these functions are distributed in contexts with distinct secure and non-secure access right levels. The functions in the secure context are accessible only by a secure program of the system-on-chip, which is possible only when the processor of the system is in a secure state.

SUMMARY

According to one aspect, a system-on-chip is provided including a memory circuit comprising a first memory region accessible with a first access right level and a second memory region accessible with the first access right level or a second access right level, at least one first peripheral having the first access right level, at least one second peripheral having the second access right level, and a direct memory access circuit able to generate direct memory accesses.

The direct memory access circuit includes at least one first direct memory access controller having the first access right level and at least one second direct memory access controller having the second access right level.

The system-on-chip includes a routing circuit configured to physically couple the at least one first peripheral with the at least one first controller and to physically couple the at least one second peripheral with the at least one second controller.

In other words, this aspect allows using a simple direct memory access circuit and supports the partition of security per channel instead of a conventional controller requiring a programming of the access rights for each use of the channels, that has complex design and use. Indeed, it is not necessary to relate, via the secure program, the security state of the peripherals to the direct memory access controller, since this is done physically by the routing circuit. Thus, it is not necessary to program the security state of the direct memory access controller in addition to the security state of the peripherals. Furthermore, the non-secure functions do not need to request a secure service from the secure program to allocate input channels to the direct memory access controller.

Thus, it is not necessary to reconfigure each controller to generate a new direct memory access to a peripheral according to the access right level of the peripheral, which allows designing a direct memory access circuit that is simpler and more reliable.

In particular, the state of each controller is not reprogrammed by the secure program of the system according to the access right level of each peripheral, which allows for example avoiding an erroneous programming of the state of the controller upon direct memory access of a memory region by an unauthorized peripheral.

According to one embodiment, the system-on-chip further comprises at least one third peripheral able to have an access right level dynamically assigned between the first access right level and the second access right level, and an access right level management system configured to assign the access right level to the at least one third peripheral, wherein the routing circuit comprises a switching circuit configured to physically couple the at least one third peripheral with the at least one first controller when the first access right level is assigned to the third peripheral, and to physically couple the at least one third peripheral with the at least one second controller when the second access right level is assigned to the third peripheral.

Thus, the routing circuit allows physically and automatically redirecting the query generated by a peripheral depending on its access right level, either towards the first controller, or towards the second controller.

According to one embodiment, the peripherals are configured to generate queries having the access right level identical to the access right level of the respective peripheral, the at least one first direct memory access controller is configured to generate a direct memory access, in response to a query having the first access right level, comprising a transfer of a data burst between the peripheral that has generated the query and the first memory region or the second memory region and the at least one second direct memory access controller is configured to generate a direct memory access, in response to a query having the second access right level, comprising a transfer of a data burst between the peripheral that has generated the query and the second memory region.

Hence, each direct memory access controller can perform a data transfer corresponding to a conventional technique for direct memory access between the memory regions and the peripherals, in a known and controlled manner while profiting from a more reliable behavior.

According to one embodiment, the routing circuit is adapted to dynamically couple a number N of the peripherals having the first access right level to the at least one first direct memory access controller and to dynamically couple a number M of the peripherals having the second access right level to the at least one second direct memory access controller.

The number N and M of peripherals corresponds to the limit number of channels that the routing circuit can assign to the peripherals respectively to the first controller and to the second controller. For example, each controller includes 8 or 16 channels. A channel represents a physical link established between a peripheral and a controller allowing conveying queries originating from the peripheral towards the controller. Thus, the dynamic coupling of the routing circuit allows that each controller can be coupled to a larger number of peripherals than the number of input channels, while profiting, herein again, from the simple use according to the aspect defined hereinbefore, i.e. the absence of the need for reprogramming the access rights of the channels of the controller by the secure program.

According to one embodiment, the first access right level is a secure access right level corresponding to secure functions and the second access right level is a non-secure access right level corresponding to non-secure functions, the system-on-chip including hardware for physical separation between the elements having the secure access right level and the elements having the non-secure access right level.

According to one embodiment, the system-on-chip further comprises a processor capable of defining the access right level of the at least one third peripheral, and a bus configured to convey communication signals between the processor, the peripherals and the memory circuit.

According to another aspect, method is provided for direct memory access to a first memory region accessible with a first access right level and to a second memory region accessible with the first access right level or a second access right level, by at least one first peripheral having the first access right level and by at least one second peripheral having the second access right level, the direct memory accesses by the at least one first peripheral being generated by at least one first direct memory access controller having the first access right level of a direct memory access circuit, and the direct memory accesses by the at least one second peripheral being generated by at least one second direct memory access controller having the second access right level.

According to one implementation, the method comprises a direct memory access to the first memory region and to the second memory region by at least one third peripheral able to have an access right level dynamically assigned between the first access right level and the second access right level, the direct memory access by the at least one third peripheral being generated by the at least one first direct memory access controller when the first access right level is assigned to the third peripheral and by the at least one second direct memory access controller when the second access right level is assigned to the third peripheral.

According to one implementation, queries are generated by the peripherals, the queries having the access right level identical to the access right level of the respective peripheral, and the direct memory accesses generated by the at least one first controller, in response to a query having the first access right level, comprise a transfer of a data burst between the peripheral that has generated the query and the first memory region or the second memory region, and, the direct memory accesses generated by the at least one second controller in response to a query having the second access right level comprise a transfer of a data burst between the peripheral that has generated the query and the second memory region.

According to one implementation, the first access right level is a secure access right level corresponding to secure functions and the second access right level is a non-secure access right level corresponding to non-secure functions, the elements having the secure access right level and the elements having the non-secure access right level being physically separated by physical separation hardware.

According to one implementation, the method comprises a dynamic coupling of a number N of the peripherals having the first access right level to the at least one first direct memory access controller and a dynamic coupling of a number M of the peripherals having the second access right level to the at least one second direct memory access controller.

According to one implementation, the first access right level is a secure access right level corresponding to secure functions and the second access right level is a non-secure access right level corresponding to non-secure functions, the elements having the secure access right level and the elements having the non-secure access right level being physically separated by physical separation hardware.

According to one implementation, the method further comprises conveying communication signals via a bus between the peripherals, the memory circuit and a processor capable of defining the access right level of the at least one third peripheral.

BRIEF DESCRIPTION OF THE DRAWINGS

Other advantages and features of the invention will appear upon examining the detailed description of non-limiting embodiments and implementations, and from the appended drawings, wherein.

DETAILED DESCRIPTION OF ILLUSTRATIVE EMBODIMENTS

Secure and non-secure contexts may be defined so that the context of the system-on-chip can adapt to the application to be executed. Indeed, some peripherals implement secure functions and the system must be in the secure context to use them, whereas other peripherals implement non-secure functions and the system must be in the non-secure context to use them. There are also peripherals whose access right level, secure or non-secure, can change depending on their uses.

The peripherals with a "secure" access right level are accessible only by the secure program, whereas the peripherals with a "non-secure" access right level may be accessible by the secure program or also by a non-secure program of the system upon executions thereof by the processor.

Typically, some peripherals may be accessible by a direct memory access (better known by the acronym "DMA" standing for "Direct Memory Access") controller which is a master device of a communication bus of the system, on which the processors, the peripherals and the memories can be connected. Upon reception of a transfer query with a direct memory access originating from a peripheral, the direct memory access controller performs one or more access(es) to the registers of this peripheral. When the peripheral has a "secure" access right level, the direct memory access controller, as well as the processor, should have the "secure" access right level.

Hence, the direct memory access controller is often used in system-on-chips to carry out data transfers between a peripheral and a memory region independently of the processor in order to avoid interruptions that might slow down the operation of the processor.

Indeed, a direct memory access controller may be required by secure applications to transfer data between secure peripherals and a secure memory region, and also by non-secure applications to transfer data between non-secure peripherals and a non-secure memory region.

To prevent a loss or a theft of sensitive data, the non-secure applications may not be allowed to configure the direct memory access controller in a secure state, which would enable them to access secure memory regions and secure peripherals. Moreover, the direct memory access queries originating from the peripherals with a secure access right level may not typically be conveyed towards a direct memory access controller in a non-secure state.

Given the fact that several peripherals can be programmed so as to have a secure or non-secure access right level, the state of the direct memory access controller is generally defined by the secure or non-secure access right level of the query generated by each peripheral and being addressed to the controller. The access right level of the query is typically defined by the secure or non-secure access right level of the peripheral at the origin of the query.

To this end, conventional direct memory access controllers are provided with several channels allowing conveying the queries of the peripherals towards the controller, and the access right level of the direct memory access controller is typically programmable for each channel. Conventionally, the secure program is intended to configure the access right level of each channel of the direct memory access controller, according to the access right level of the query received by the controller.

Furthermore, the channels of the conventional controllers are typically small in number compared to the number of peripherals of the system. Consequently, the secure program may dynamically assign channels to the different peripherals and define their access right levels as a function of the peripherals that are active and their respective access right levels. In addition, the regular re-assignment of the channels to peripherals systematically generates interruptions and implementations of the secure program, which deteriorates the overall performances of the system. Consequently, the conventional direct memory access controllers are complex with regards to their designs and their uses.

Some implementations and embodiments described herein propose a direct memory access controller which is simple and capable of managing the direct memory accesses in a standalone manner without any configuration of the controller by the secure software of the system-on-chip.

Figure 1:
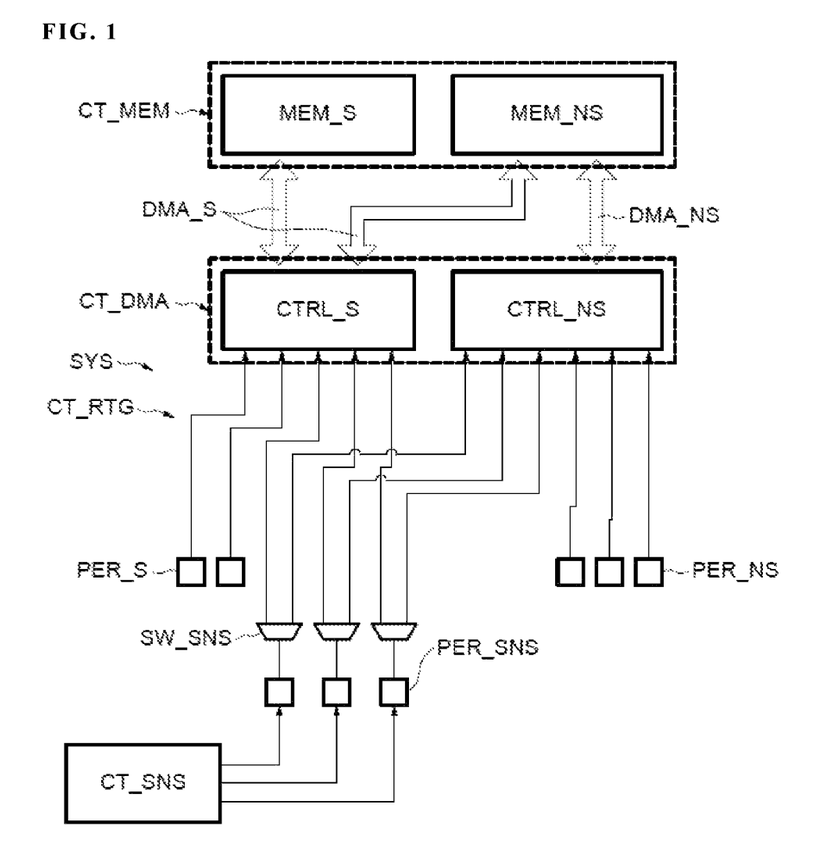
FIG. 1 illustrates a system-on-chip according to an embodiment.

FIG. 1 illustrates a system-on-chip SYS. The system SYS includes a memory circuit CT_MEM, at least one first peripheral PER_S and at least one second peripheral PER_NS. In various embodiments all components or a subset of the components shown in FIG. 1 may be disposed on a single integrated circuit. This integrated circuit may include a single semiconductor substrate such as a silicon substrate. Alternatively, the components may be disposed on different integrated circuits. For example, peripherals PER_S, PER_NS and/or PER_SNS may be external components.

The memory circuit CT_MEM comprises a first memory region MEM_S accessible with a first access right level and a second memory region MEM_NS accessible with the first access right level or a second access right level. The memory circuit CT_MEM may be a SRAM or DRAM for example which includes several memory regions defined at different memory addresses. Alternatively, the memory circuit CT_MEM may also be designed from at least two distinct memories including a memory MEM_S accessible with the first access right level and a memory MEM_NS accessible with the second access right level.

In particular, the first access right level may be a "secure" access right level and the second access right level may be a "non-secure" access right level. The "secure" access right level corresponds to secure functions which can be implemented by the first peripherals PER_S and the first memory region MEM_S for example. The "non-secure" access right level corresponds to non-secure functions which can be implemented by the second peripherals PER_NS and the second memory region MEM_NS for example. The system-on-chip SYS includes hardware for physical separation SEC between the elements having the secure access right level, such as the first peripherals PER_S and the first memory region MEM_S, and the elements having the non-secure access right level, such as t the second peripherals PER_NS and the second memory region MEM_NS. For example, the physical separation hardware includes security interfaces SEC which will be described later on in connection with FIG. 2.

The system SYS as represented in FIG. 1 includes several first peripherals PER_S, for example two, and several second peripherals PER_NS, for example three. The first peripherals PER_S have the first access right level and the second peripherals PER_NS have the second access right level.

The system SYS also includes at least one third peripheral PER_SNS, for example three. The third peripherals PER_SNS are able to have an access right level dynamically assigned between the first access right level and the second access right level.

The first peripherals PER_S are configured to generate a query having the first access right level and the second peripherals PER_NS are configured to generate a query having the second access right level. The third peripherals PER_SNS are configured to generate a query having the first access right level or a query having the second access right level depending on the access right level that is assigned thereto. The query may be a direct memory access query to transfer data between a peripheral and a memory region.

The system-on-chip SYS further comprises an access right level management system CT_SNS. The access right level management system CT_SNS is configured to assign the respective access right levels of the third peripherals PER_SNS.

For example, the access right level management system CT_SNS can assign the first access right level or the second access right level to each of the third peripherals PER_SNS. The third peripheral(s) PER_SNS having the first access right level are configured to generate a query having the first access right level and the third peripheral(s) having the second access right level are configured to generate a query having the second access right level.

For example, the access right level management system CT_SNS may be implemented by software by a secure program of the system SYS (cf. the description hereinafter in connection with FIG. 2).

Moreover, the system SYS includes a direct memory access circuit CT_DMA able to generate direct memory accesses DMA_S and DMA_NS and a routing circuit CT_RTG able to convey the queries generated by the peripherals PER_S, PER_NS, PER_SNS towards the direct memory access circuit CT_DMA.

The direct memory access circuit CT_DMA includes at least one first direct memory access controller CTRL_S and at least one second direct memory access controller CTRL_NS. The first direct memory access controller CTRL_S has the first access right level which may be the "secure" access right level, and the second direct memory access controller CTRL_NS has the second access right level which may be the "non-secure" access right level.

The routing circuit CT_RTG is configured to physically couple the at least one first peripheral PER_S with the at least one first controller CTRL_S and to physically couple the at least one second peripheral PER_NS with the at least one second controller CTRL_NS.

The first peripherals PER_S are physically coupled via the routing circuit CT_RTG with the first direct memory access controller CTRL_S and the second peripherals PER_NS are physically coupled via the routing circuit CT_RTG with the second direct memory access controller CTRL_NS. The routing circuit CT_RTG may be a circuit including electrical wires welded between the first peripherals PER_S and the first direct memory access controller CTRL_S and other electrical wires welded between the second peripherals PER_NS and the second direct memory access controller CTRL_NS. In particular, the wires of the routing circuit CT_RTG enable a communication between the peripherals and the controllers to which they are coupled, like for example a transmission of a query between a peripheral and a controller.

The routing circuit CT_RTG comprises switching circuit SW_SNS, such as conventional switching circuits provided with transistors for example.

The switching circuit SW_SNS is configured to physically couple the at least one first controller CTRL_S with the third peripherals PER_SNS having the first access right level, and to physically couple the at least one second controller CTRL_NS with the third peripherals PER_SNS having the second access right level.

To carry out this coupling of the third peripherals PER_SNS with the first controller CTRL_S and with the second controller CTRL_NS, each switching circuit SW_SNS may comprise an input connected to a respective third peripheral PER_SNS and two outputs respectively connected to the first controller CTRL_S and to the second controller CTRL_NS via electrical wires of the routing circuits CT_RTG. The switching circuit SW_SNS is configured to toggle on either one of their outputs to transmit the query to the corresponding direct memory access controller CTRL_S, CTRL_NS, according to the access right level of the query received on their inputs. Of course, the number of outputs of the switching circuit SW_SNS may be adapted to the number of first controllers CTRL_S and to the number of second controllers CTRL_NS. As described before, the wires of the routing circuit CT_RTG enable in particular a communication between the peripherals and the controllers to which they are coupled, in particular a transmission of a query between a peripheral and a controller for example.

Thus, the routing circuit CT_RTG allows redirecting the query generated by the peripheral PER_SNS according to its access right level either towards the first controller CTRL_S or towards the second controller CTRL_NS.

Said at least one first direct memory access controller CTRL_S and the at least one second direct memory access controller CTRL_NS comprise channels via which they can receive the queries of the peripherals. A channel represents a physical link established between a peripheral and a controller allowing conveying queries originating from the peripheral towards the controller.

Given the fact that not all of the peripherals PER_S, PER_NS, PER_SNS are coupled to the same controller, the channels are distributed between the first controller CTRL_S and the second controller CTRL_NS thereby enabling a partition of security per channel. The partition of security per channel corresponds to conveying queries having the first access right level via the channels of the first controller CTRL_S, also having the first access right level, and to conveying queries having the second access right level via the channels of the second controller CTRL_NS, also having the second access right level.

The first controller CTRL_S may include for example 8 or 16 channels used by the first peripherals PER_S and the third peripherals PER_SNS, and the second controller CTRL_NS may include 8 or 16 channels used by the second peripherals PER_NS and the third peripherals PER_SNS.

The direct memory access queries generated by the peripherals PER_S, PER_SNS and PER_NS are port of the process enabling the direct memory access circuit CT_DMA to generate the different direct memory accesses.

The first direct memory access controller CTRL_S is configured to generate a direct memory access DMA_S in response to a query having the first access right level. The direct memory access DMA_S comprises a transfer of a data burst between the first peripheral PER_S or the third peripheral PER_SNS that has generated the query and the first memory region MEM_S or the second memory region MEM_NS.

The second direct memory access controller CTRL_NS is configured to generate a direct memory access DMA_NS in response to a query having the second access right level. The direct memory access DMA_NS comprises a transfer a data burst between the second peripheral PER_NS or the third peripheral PER_SNS that has generated the query and the second memory region MEM_NS.

Hence, each direct memory access controller can perform a data transfer DMA_S or DMA_NS corresponding to a conventional technique for direct memory access between the memory regions MEM_S and MEM_NS and the peripherals PER_S, PER_SNS and PER_S, in a known and controlled manner while profiting from a more reliable behavior.

The direct memory access controllers CTR_S and CTRL_NS typically include a limited number of channels allowing communicating with the peripherals and receiving a direct memory access query. To be able to generate a direct memory access for all of the peripherals coupled to a direct memory access controller, the routing circuit CT_RTG may be adapted to dynamically couple peripherals to the controllers.

Advantageously, the routing circuit CT_RTG is adapted to dynamically couple a number N of peripherals PER_S and PER_SNS having the first access right level to the at least one first direct memory access controller CTRL_S and to dynamically couple a number M of peripherals PER_NS and PER_SNS having the second access right level to the at least one second direct memory access controller CTRL_NS.

The number N and M of peripherals corresponds to the limit number of channels that the routing circuit CT_RTG can assign to the peripherals respectively to the first controller CTRL_S and to the second controller CTRL_NS. For example, each controller includes 8 or 16 channels. Thus, the dynamic coupling of the routing circuit CT_RTG allows that each controller CTRL_S and CTRL_NS can be coupled to a larger number of peripherals than the number of input channels, while profiting from the simple use of the controller, i.e. the absence of need for reprogramming the access rights of the channels of the controller by the secure program.

Figure 2:
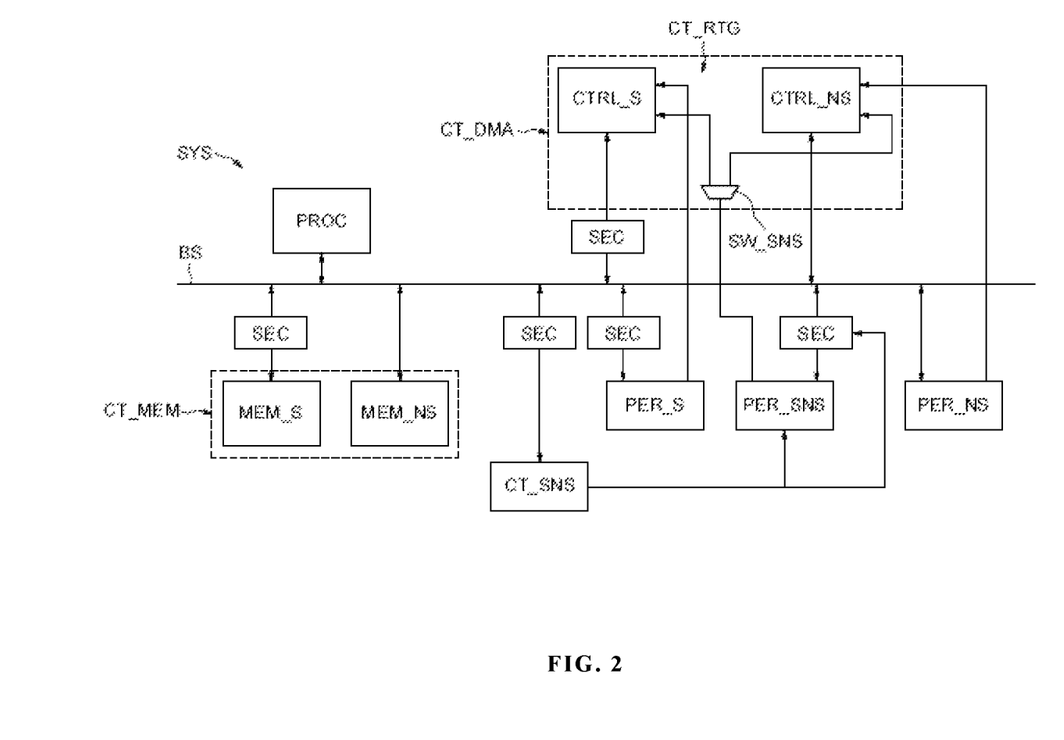
FIG. 2 illustrates a system-on-chip that further includes a processor and a bus according to an embodiment.

Henceforth, reference is made to FIG. 2, which illustrates the system-on-chip SYS describes before in connection with FIG. 1, which further comprises a processor PROC and a bus BS. The processor PROC is capable of defining the access right level of the at least one third peripheral PER_SNS, via the access right level management system CT_SNS upon execution of the secure software for example. For example, the access right level management system CT_SNS may be implemented by software by the secure program of the processor PROC which is the only one capable of individually managing the access right level of a peripheral PER_SNS, for example by modifying the value of a dedicated bit corresponding to the access right level of the peripheral PER_SNS.

The processor PROC, the controllers CTRL_S and CTRL_NS, the memory circuit CT_MEM as well as the peripherals PER_S, PER_SNS and PER_NS are coupled to the bus BS. The security interface SEC belonging to the physical separation hardware may be provided between the bus BS and the secure elements of the system SYS, like for example the memory region MEM_S, the access right level management system CT_SNS, the first controller CTRL_S, the first peripherals PER_S and the third peripherals PER_SNS. For example, the security interface SEC allows authorizing or preventing an access to a secure element of the system depending on the access right level. In some embodiments, the physical separation hardware may include a register buffer that is controlled by secure portions of the system, such as a secure program.

The bus BS is configured to convey communication signals, for example digital signals, between the processor PROC, the peripherals PER_S, PER_SNS and PER_NS, and the memory circuit CT_MEM. Hence, the data transfer DMA_S or DMA_NS can be done via the direct memory access circuit CT_DMA between a peripheral and a memory region in both directions through the bus BS.

In contrast with conventional system-on-chips wherein the access right level of the channel of the controller must be configured by the secure program of the processor PROC, the system SYS described in connection with FIGS. 1 and 2 comprises controllers CTRL_S, CTRL_NS having channels whose access right level is already defined by the access right level of the controller.

It should be recalled that the first direct memory access controller CTRL_S has the first access right level which may be the "secure" access right level, and the second direct memory access level CTRL_NS has the second access right level which may be the "non-secure" access right level.

Thanks to the system SYS, the first controller CTRL_S and the second controllers CTRL_NS no longer need actions from the secure program to enable the peripherals PER_S implementing functions of a secure context to access the secure MEM_S and non-secure MEM_NS memory regions and the peripherals PER_NS implementing functions of a non-secure context to access the non-secure memory region MEM_NS.

In addition, no action of the secure program is also required to reconfigure the access right level of the channels of the controller upon reception of a query originating from peripherals having a configurable access right level. Consequently, the system SYS is perfectly adapted to the use of third peripherals PER_SNS having configurable access right levels, which are capable of implementing secure functions and non-secure functions.

Thus, each direct memory access controller as described before is simple and supports the partition of security per channel. Indeed, the routing circuit CT_RTG is configured to relate the security state of the peripherals PER_S, PER_SNS and PER_NS to the corresponding direct memory access controller. In other words, the security state of the direct memory access controller does not need to be programmed with regards to the security state of the peripherals PER_S, PER_SNS and PER_NS. Consequently, the non-secure functions do not need to request a secure service from the secure program to allocate input channels to the direct memory access controller.

Thus, it is not necessary to reconfigure each controller to generate a new direct memory access DMA_S or DMA_NS to a peripheral PER_S, PER_SNS or PER_NS according to the access right level of the peripheral, which allows designing a simpler controller.

In particular, the state of each controller is not reprogrammed by the secure program of the system according to the access right level of each peripheral PER_S, PER_SNS or PER_NS, which allows for example avoiding an erroneous programming of the state of the controller upon a direct memory access DMA_S or DMA_NS of a memory region by an unauthorized peripheral.

What is claimed is:
1. A system-on-chip including:
a memory circuit comprising a first memory region accessible with a first access right level and a second memory region accessible with the first access right level or a second access right level, at least one first peripheral having the first access right level, at least one second peripheral having the second access right level;
a direct memory access circuit configured to generate direct memory accesses for the first memory region and the second memory region, wherein the direct memory access circuit includes at least one first direct memory access controller having the first access right level and at least one second direct memory access controller having the second access right level; and
a routing circuit comprising:
at least one first signal line directly coupled from the at least one first peripheral to the at least one first direct memory access controller, and
at least one second signal line directly coupled from the at least one second peripheral to the at least one second direct memory access controller, wherein the first direct memory access controller is configured to receive a first direct memory access query having the first access right level from the at least one first peripheral via the at least one first signal line, and the second direct memory access controller is configured to receive a second direct memory access query having the second access right level from the at least one second peripheral via the at least one second signal line, and
a switching circuit configured to:
operatively couple at least one third signal line from at least one third peripheral to the at least one first direct memory access controller in response to the first access right level being assigned to the at least one third peripheral, and
operatively couple the at least one third signal line from the at least one third peripheral to the at least one second direct memory access controller in response to the second access right level being assigned to the at least one third peripheral, wherein the first direct memory access controller is further configured to receive a third direct memory access query having the first access right level from the at least one third peripheral via the at least one third signal line, and the second direct memory access controller is further configured to receive a fourth direct memory access query having the second access right level from the at least one third peripheral via the at least one third signal line.

2. The system-on-chip according to claim 1, further comprising:
the at least one third peripheral, wherein the at least one third peripheral is configured to have an access right level dynamically assigned between the first access right level and the second access right level; and
an access right level management system configured to assign the access right level to the at least one third peripheral.

3. The system-on-chip according to claim 2, wherein the routing circuit is configured to:
dynamically couple a number N of the peripherals having the first access right level to the at least one first direct memory access controller; and
dynamically couple a number M of the peripherals having the second access right level to the at least one second direct memory access controller.

4. The system-on-chip according to claim 2, further comprising:
a processor configured to define the access right level of the at least one third peripheral; and
a bus configured to convey communication signals between the processor, the peripherals and the memory circuit.

5. The system-on-chip according to claim 2, wherein the routing circuit comprises a multiplexer having a first port coupled to the at least one third peripheral, a second port coupled to the first direct memory access controller, and a third port coupled to the second direct memory access controller, wherein the multiplexer is configured to couple the first port to the second port in response to the first access right level being assigned to the at least one third peripheral, and is configured to couple the first port to the third port in response to the second access right level being assigned to the at least one third peripheral.

6. The system-on-chip according to claim 1, wherein:
the at least one first peripheral and the at least one second peripheral are configured to generate queries having an access right level identical to the access right level of the respective peripheral;
the at least one first direct memory access controller is configured to generate a first direct memory access in response to the first direct memory access query having the first access right level, comprising a transfer of a data burst between the peripheral that has generated the first direct memory access query and the first memory region or the second memory region; and
the at least one second direct memory access controller is configured to generate a second direct memory access in response to the second direct memory access query having the second access right level, comprising a transfer of a data burst between the peripheral that has generated the second direct memory access query and the second memory region.

7. The system-on-chip according to claim 1, wherein:
the first access right level is a secure access right level corresponding to secure functions;
the second access right level is a non-secure access right level corresponding to non-secure functions; and
the system-on-chip further includes physical separation hardware between elements having the secure access right level and elements having the non-secure access right level.

8. A method for direct memory access comprising:
generating first direct memory accesses to a first memory region accessible with a first access right level for at least one first peripheral with the first access right level using at least one first direct memory access controller of a direct memory access circuit;
generating second direct memory accesses to a second memory region accessible with the first access right level or accessible with a second access right level for the at least one first peripheral with the first access right level using the at least one first direct memory access controller, wherein the first direct memory accesses and the second direct memory accesses are performed in response to query signal transmitted on a first signal line directly connected between the first peripheral and the first direct memory access controller;
generating third direct memory accesses to the second memory region accessible by at least one second peripheral with the second access right level using at least one second direct memory access controller of the direct memory access circuit having the second access right level, wherein the third direct memory accesses and the second direct memory accesses are performed in response to query signal transmitted on a second signal line directly connected between the first peripheral and the second direct memory access controller;
in response to at least one third peripheral having the first access right level, routing a third signal line between the at least one third peripheral and the at least one first direct memory access controller via a first routing path;
in response to a direct memory access query received by the at least one first direct memory access controller from the at least one third peripheral via the first routing path, generating fourth direct memory accesses to the first memory region or to the second memory region for the at least one third peripheral using the at least one first direct memory access controller;
in response to the at least one third peripheral having the second access right level, routing the third signal line between the at least one third peripheral and the at least one second direct memory access controller via a second routing path; and
in response to a direct memory access query received by the at least one second direct memory access controller from the at least one third peripheral via the second routing path, generating fifth direct memory accesses to the second memory region for the at least one third peripheral.

9. The method according to claim 8, further comprising dynamically assigning the first access right level and the second access right level to the at least one third peripheral.

10. The method according to claim 8, further comprising conveying communication signals via a bus between the at least one first peripheral, the at least one second peripheral, and the at least one third peripheral.

11. The method according to claim 10, further comprising defining, by a processor, an access right level of the at least one third peripheral.

12. The method according to claim 8, further comprising:
generating first queries by the at least one first peripheral, wherein the first queries have the first access right level;
generating second queries by the at least one first peripheral, wherein the first queries have the second access right level;
generating third queries by the at least one second peripheral, wherein the third queries have the second access right level, wherein
generating the first direct memory accesses by the at least one first direct memory access controller is performed in response to the first queries and comprise transferring a data burst between the at least one first peripheral and the first memory region;

generating the second direct memory accesses by the at least one first direct memory access controller is performed in response to the second queries and comprises transferring a data burst between the at least one first peripheral and the second memory region; and generating the third direct memory accesses by the at least one second direct memory access controller is performed in response to the third queries and comprises transferring a data burst between the at least one second peripheral and the second memory region.

13. The method according to claim 8, further comprising:
dynamically coupling a first number of peripherals having the first access right level to the at least one first direct memory access controller; and
dynamically coupling a second number of peripherals having the second access right level to the at least one second direct memory access controller.

14. The method according to claim 8, wherein:
the first access right level is a secure access right level corresponding to secure functions;
the second access right level is a non-secure access right level corresponding to non-secure functions; and
elements having the secure access right level and elements having the non-secure access right level are physically separated by physical separation hardware.

15. A system-on-chip including:
a first direct memory access circuit having a first access right level, the first direct memory access circuit having a first query port configured to be directly coupled to a query port of a first peripheral, wherein the first peripheral is configured to have the first access right level, and the first direct memory access circuit is configured to receive direct memory access queries from the first peripheral via the first query port;
a second direct memory access circuit having a second access right level, the second direct memory access circuit having a second query port configured to be directly coupled to a query port of a second peripheral, wherein the second peripheral is configured to have the second access right level, and the second direct memory access circuit is configured to receive direct memory access queries from the second peripheral via the second query port;
a memory circuit coupled to the first direct memory access circuit and the second direct memory access circuit, the memory circuit comprising a first memory region accessible with the first access right level and a second memory region accessible with the first access right level or the second access right level; and a multiplexer having a first port configured to be coupled to a query port of a third peripheral and a second port selectively couplable to a third query port of the first direct memory access circuit and a fourth query port of the second direct memory access circuit.

16. The system-on-chip of claim 15, further comprising:
an access right controller configured to
dynamically assign the first access right level and the second access right level to the third peripheral,
couple the query port of the third peripheral to the third query port of the first direct memory access circuit in response to the first access right level being assigned to the third peripheral, and
couple the query port of the third peripheral to the fourth query port of the second direct memory access circuit in response to the second access right level being assigned to the third peripheral.

17. The system-on-chip of claim 16, further comprising:
the first peripheral;
the second peripheral; and
the third peripheral.

18. The system-on-chip of claim 16, wherein:
the first peripheral, the second peripheral and the third peripheral are configured to generate queries having an access right level identical to an access right level of the respective peripheral;
the first direct memory access circuit is configured to generate a first direct memory access in response to a first query from a peripheral having the first access right level, the first direct memory access comprising transferring a data burst between the peripheral generating the first query and the first memory region or the second memory region; and
the second direct memory access circuit is configured to generate a second direct memory access in response to a second query having the second access right level, the second direct memory access comprising transferring a data burst between the peripheral generating the second query and the second memory region.

19. The system-on-chip of claim 15, wherein the first direct memory access circuit, the second direct memory access circuit and the memory circuit are disposed on a single integrated circuit.

20. The system-on-chip of claim 15, wherein:
the first access right level is a secure access right level corresponding to secure functions; and
the second access right level is a non-secure access right level corresponding to non-secure functions.

* * * * *

UNITED STATES PATENT AND TRADEMARK OFFICE
CERTIFICATE OF CORRECTION

PATENT NO. : 12,360,684 B2
APPLICATION NO. : 18/192237
DATED : July 15, 2025
INVENTOR(S) : Wallis et al.

Page 1 of 1

It is certified that error appears in the above-identified patent and that said Letters Patent is hereby corrected as shown below:

In the Claims

In Column 12, in Claim 8, Line 10, after "response to" insert -- a --.

In Column 12, in Claim 8, Line 20, after "response to" insert -- a --.

In Column 13, in Claim 12, Line 10, delete "comprises" and insert -- comprise --.

Signed and Sealed this
Twenty-third Day of September, 2025

John A. Squires
*Director of the United States Patent and Trademark Office*